UNITED STATES PATENT OFFICE.

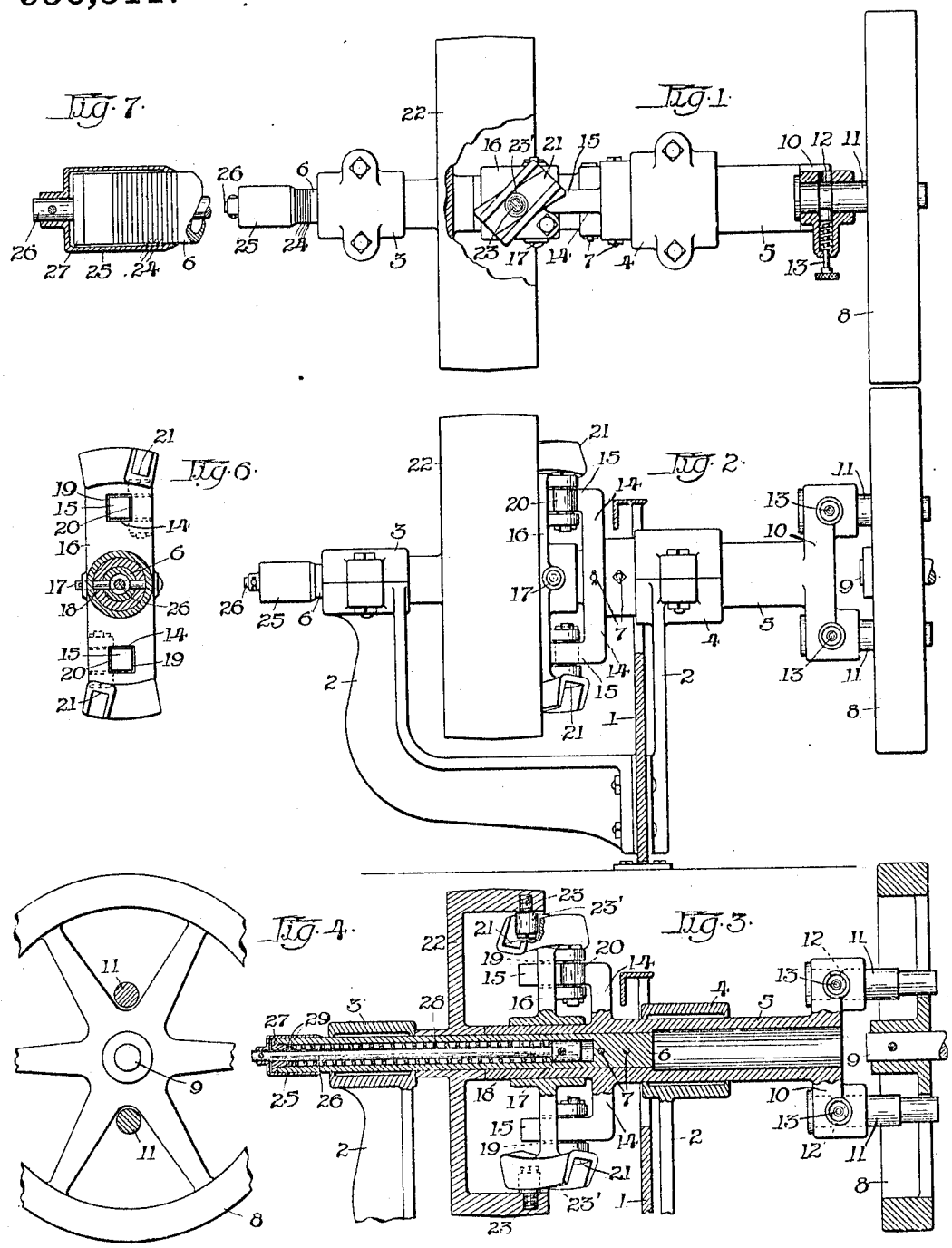

EDWARD A. JOHNSTON, OF AKRON, OHIO, ASSIGNOR TO INTERNATIONAL HARVESTER COMPANY, A CORPORATION OF NEW JERSEY.

DYNAMOMETER.

950,511.  Specification of Letters Patent.  Patented Mar. 1, 1910.

Application filed November 30, 1908. Serial No. 465,339.

*To all whom it may concern:*

Be it known that I, EDWARD A. JOHNSTON, a citizen of the United States, residing at Akron, in the county of Summit and State of Ohio, have invented certain new and useful Improvements in Dynamometers, of which the following is a specification.

My invention relates to dynamometers of that type designed to measure the power transmitted from a rotatable driving member connected with a source of power to a rotatable driven member; the object of the invention being to provide a mechanism simple in construction and accurate in operation. These objects are attained by means of the mechanism illustrated by the accompanying drawings, in which—

Figure 1 is a top plan view, partly in section, designed to illustrate the connection between the driving and driven members of the mechanism; Fig. 2 is a side elevation of Fig. 1; Fig. 3 is a vertical longitudinal section of Fig. 2; Fig. 4 is an end elevation of a part of Fig. 3, designed to illustrate the manner of connecting the dynamometer mechanism with a source of power; Fig. 5 is a detail drawing of a part of Fig. 3, and designed to illustrate the manner of connecting part of the driving mechanism of the dynamometer with its driving shaft; Fig. 6 is a detail of part of the driving mechanism forming part of the dynamometer; and Fig. 7 represents an enlarged detail of the power registering mechanism.

Referring to the drawings, in which the same reference numerals designate like parts throughout the several views, 1 represents a base frame member, to which are secured vertically arranged members 2, having horizontal bearings 3 and 4, in which is journaled a shaft, preferably constructed in two parts, having a sleeve portion 5 journaled in bearing 4, and to which is secured the inner end of a hollow shaft 6 by means of pins 7, which portion of the shaft is journaled in bearing 3, having its outer end projecting beyond the bearing.

8 represents a fly wheel connected to the source of power, which may be an explosive engine, and 9 represents an engine shaft. Means whereby the fly wheel may be connected with the sleeve portion of the shaft consist of a cross-head 10, having longitudinal openings therethrough that are adapted to receive studs 11, the studs being provided with annular grooves 12 adapted to receive the inner ends of spring-pressed locking pins 13, whereby the studs are releasably held in position to transmit motion from the fly wheel to the dynamometer shaft. Integral with the sleeve portion 5 of the dynamometer shaft are radial arms 14, having at their outer ends longitudinally arranged driving dogs 15, and 16 represents a driving member mounted upon the sleeve portion of the shaft and secured thereto by means of a pin 17 in a manner to rotate therewith; the sleeve portion 5 and the hollow portion 6 of the shaft being provided with a longitudinally arranged slot 18, whereby the driving member 16 is permitted to slide longitudinally relative to the axis of the shaft.

The driving member consists of oppositely disposed arms having openings 19 therein that are adapted to loosely receive the driving dogs 15, and 20 designates rollers journaled upon the arms adjacent the openings therein and adapted to engage with the driving face of the dogs, the arms being provided at their outer ends with peripheral and helically arranged cam tracks 21.

22 represents a power transmitting pulley journaled upon the hollow member of the shaft, having the inwardly projecting studs 23 secured to the rim thereof, and having rollers 23¹ journaled thereon and engaging with the cam tracks 21.

The outer end of the hollow shaft is provided with circumferential lines 24 designed as a scale to indicate the amount of power being transmitted by the driving member, and 25 represents a thimble inclosing the end of the shaft and having its outer end secured to a rod 26 inclosed within the hollow of the shaft and having its inner enlarged end connected with the driving member 16 by means of the pin 17.

27 represents a threaded cap engaging with the outer end of the shaft, and provided with an axial opening adapted to receive the rod 26, and 28 represents a coiled spring surrounding the reduced portion of the rod and operative between the cap and the enlarged inner end of the rod in a manner to resist a longitudinal movement of the rod in one direction, and the tension of the spring may be adjusted by means of washers 29.

In operation the mechanism is connected with a source of power, the force of which it is desired to ascertain, by means of the studs 11, and rotative movement is thereby transmitted to the shaft, which is communicated to the driving member 16 and by the latter to the pulley 22, which may be connected by means of a belt to a line shaft or other machinery, as desired. The force opposing a rotative movement of the pulley will operate as a resistance in opposing a rotative movement of the driving member 16, the force of the resistance causing the latter to have a differential angular movement relative to the pulley, and by means of the helically arranged cam tracks such movement will cause the driving member to slide longitudinally along the shaft and through its connection with the indicator thimble 25 cause the latter to expose the lines of the scale 24 in a manner to indicate the amount of power being transmitted.

What I claim as my invention, and desire to secure by Letters Patent, is:

1. A dynamometer including, in combination, a hollow shaft, bearings in which said shaft is mounted, means for rotating said shaft, said means adapted to be connected with a source of power, a power transmitting pulley loosely mounted upon said shaft, a driving member slidably connected with said shaft and adapted to rotate therewith, means for transmitting rotative movement from said shaft to said driving member, said means including radially disposed arms secured to said shaft, longitudinally arranged driving dogs forming part of said arms, radially journaled rollers mounted upon said driving member and engaging with said dogs, said driving member having helically arranged cam tracks upon its periphery, radially journaled rollers mounted upon said pulley and engaging with said cam tracks, and a rod within said hollow shaft having one end connected with said driving member and its opposite end with a power registering mechanism and means for yieldingly resisting a movement of said shaft in one direction.

2. A dynamometer including, in combination, a hollow shaft, bearings in which said shaft is mounted, means for rotating said shaft, said means being adapted to be connected to a source of power, a power transmitting member loosely mounted upon said shaft, a driving member connected with said shaft and adapted to rotate therewith, said driving member having helically arranged cam tracks upon its periphery, radially arranged rollers journaled in said power transmitting member and engaging with said tracks, a rod within said hollow shaft having one end connected with said driving member and its opposite end with a power registering mechanism, and a spring surrounding said rod and adapted to yieldingly resist a longitudinal movement thereof in one direction.

EDWARD A. JOHNSTON.

Witnesses:
W. L. CARLTON,
F. G. RUSSELL.